United States Patent Office 3,161,106
Patented Dec. 15, 1964

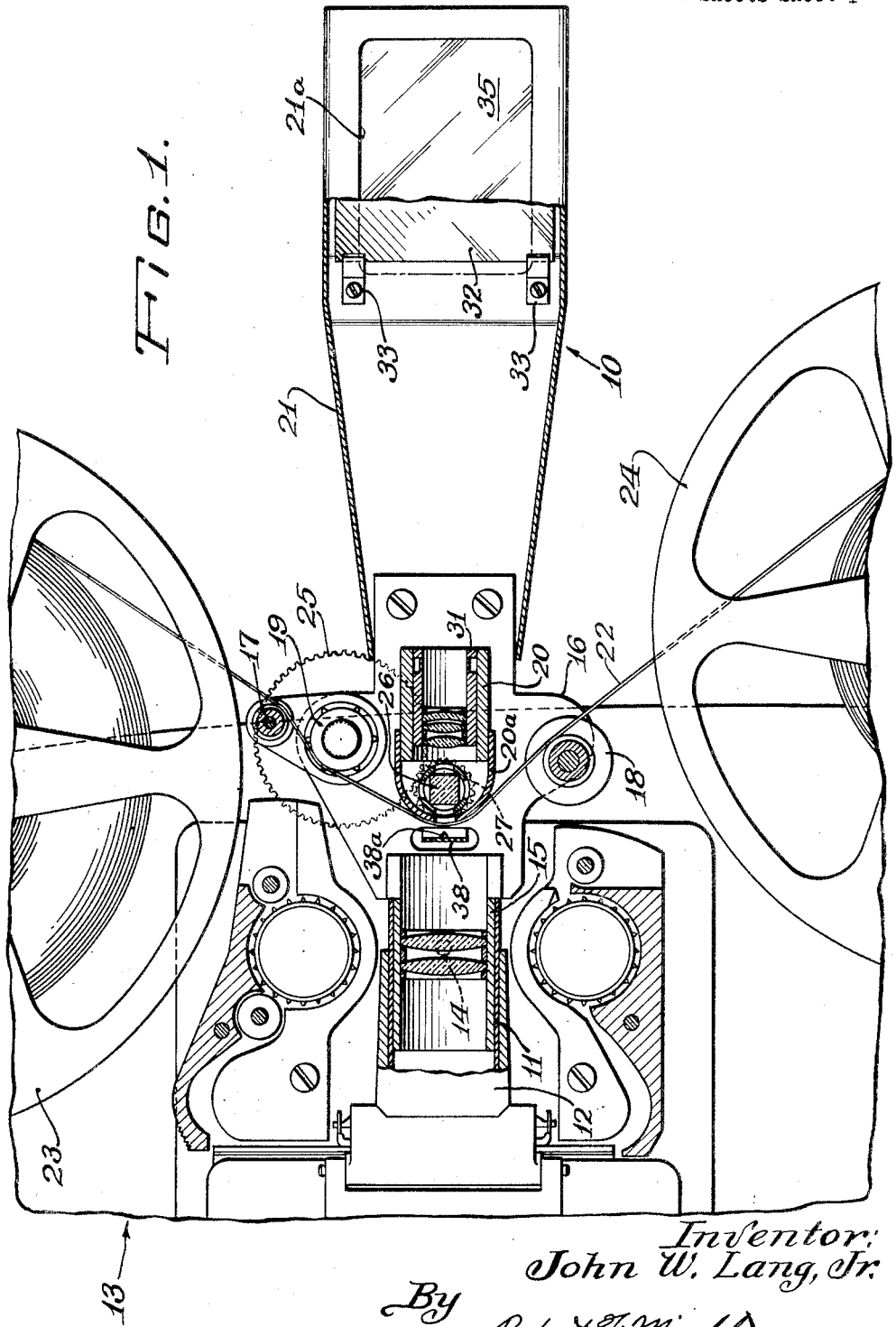

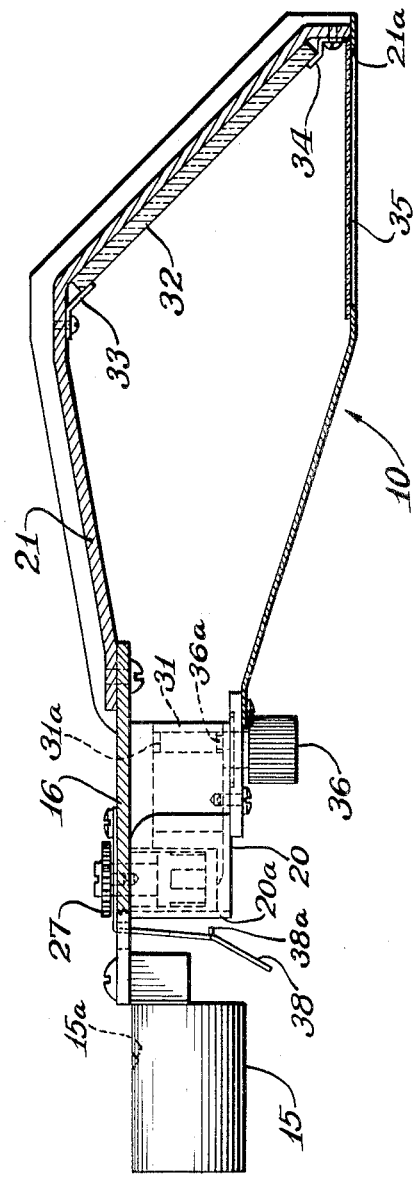

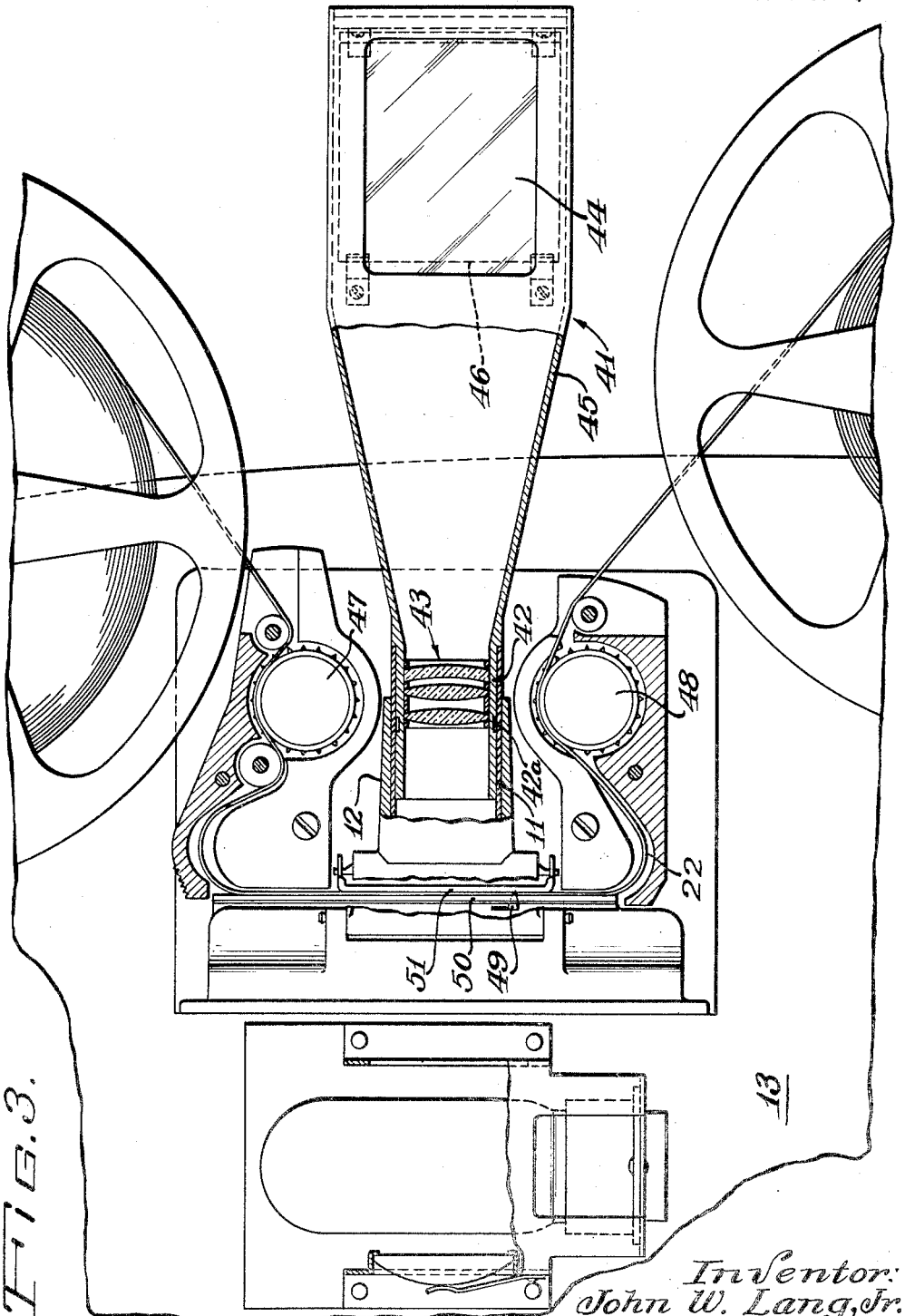

3,161,106
VIEWING ATTACHMENTS
John W. Lang, Jr., Park Ridge, Ill., assignor to Bell & Howell Company, Chicago, Ill., a corporation of Illinois
Filed May 11, 1961, Ser. No. 109,374
1 Claim. (Cl. 88—24)

This invention relates to viewing attachments for motion picture projectors, and more particularly to viewing attachments having ground glass screens for backlighting projection.

An object of the invention is to provide viewing attachments having wide angle lenses and ground glass screens which may be substituted for projector lenses and mounted by the gates of motion picture projectors.

Another object of the invention is to provide a viewing attachment for a motion picture projector having a tubular lens holder designed to be substituted for the lens holder of a motion picture projector and thereby mount the attachment on the projector.

A further object of the invention is to provide an editing attachment for a motion picture projector and provided with a ground glass screen and a film driven shutter together with a wide angle projection lens which may be substituted for the projection lens and which serves to mount the attachment on the projector.

A complete understanding of the invention may be obtained from the following detailed description of viewing attachments forming specific embodiments thereof, when read in conjunction with the appended drawings, in which:

FIG. 1 is a fragmentary, partially sectional, side elevation view of a viewing attachment forming one embodiment of the invention;

FIG. 2 is a horizontal sectional view of the viewing attachment of FIG. 1; and

FIG. 3 is a fragmentary, partially sectional, side elevation view of a viewing attachment forming an alternate embodiment of the invention.

The invention provides viewing attachments for motion picture projectors which may be mounted in the projectors by substituting lens holders of the attachment for the lens holders of the projectors. In one embodiment of the invention, the attachment has a wide angle lens mounted in a holder designed to fit into and be locked to the lens mounting portion of the projector to mount the attachment on the projector, the film being fed through the projector gate and the attachment having a ground glass screen facing the side of the projector and a mirror for deflecting light from the lens onto the screen. In an attachment forming another embodiment of the invention, there may be a lens holder substitutable for the lens of the projector and having a sprocket over which the film travels and serving to drive a shutter in the attachment in synchronism with the advancement of the film.

Referring now in detail to the drawings, there is shown in FIGS. 1 and 2 a viewing attachment 10 supportable by a known lens carrier 11 of a gate 12 of a motion picture projector 13, the attachment 10 being supported by the lens carrier 11 and locked thereto by set screw 14 projecting into a recess 15a in a lens holder 15 of the attachment, the lens holder 15 being substituted for the usual projection lens holder (not shown). The lens holder is rigidly attached to a mechanism plate 16 carrying guide rollers 17 and 18, sprocket 19, tubular lens carrier 20 having rounded aperture plate portion 20a, and lightweight, tapered light tube 21. Film 22 from supply reel 23 of the projector travels over the sprocket 19 and past the aperture plate portion 20a and roller 18 to takeup reel 24 of the projector, and is advanced by manually turning the takeup reel. The film turns the sprocket 19 which is keyed to a gear 25 which drives shutter 26 through gear 27 meshed with gear 25 in synchronism with the frames of the film.

A wide angle projection lens barrel 31 is mounted for longitudinal adjustment for focusing in the lens carrier 20, and light from the lens travels to a handing mirror 32 mounted in the light tube by tabs 33 and 34 to deflect the rays to a ground glass screen 35 secured by suitable means such as, for example, an adhesive to the tube 21 in a position covering an opening 21a. A focusing knob 36 has an eccentric pin 36a projecting into annular slot 31a in the lens barrel 31 for moving the lens barrel 31 along the carrier 20. A spring arm 38 carries a pricking tab 38a for marking the film during editing. The lens holder 15 carries lenses 39 and 40 forming a part of the lens system of the attachment. Light is supplied from the usual lamp and condensers (not shown) of the projector to the left of the gate 12.

In FIG. 3, there is shown a viewing attachment 41 designed to be substituted for the normal projector lens (not shown) of the projector 13 and be mounted in the lens carrier 11 of the gate 12. In the attachment 41, a lens holder 42 carries a wide angle lens 43 and rays from the film 22 are imaged on a ground glass screen 44 carried by tapered light tube 45 by the lens 43 and a "handing" mirror 46 carried in the tube. The film is fed by sprockets 47 and 48 and known intermittent feed 49 of the projector, and travels between aperture plate 50 and pressure plate 51 of the projector, the projector being operated in the normal fashion for viewing on the backlighted screen 44. Focusing is accomplished by moving the lens holder 42 along the carrier 11 in the normal manner, an annular slot 42a being provided to receive the eccentric pin (not shown) of the projector.

While the invention is thus described, it is not wished to be limited to the precise details described, as changes may be readily made without departing from the spirit of the invention.

What is claimed is:

A viewing attachment for a motion picture projector, which comprises a tapered light tube having *a lens holding means at one end thereof designed* to be substituted for a lens holder of the projector, a plurality of lenses in the lens holding means, a mirror at the other end of the tube, a ground glass screen positioned to receive light from the mirror, *sprocket means rotatably mounted on said attachment* and adapted to engage a length of film passing through said attachment, *an aperture plate portion on said attachment* adapted to guide said film in a fixed path relative to said plurality of lenses, a *rotating shutter* adapted to be drivingly rotated by means associated with said sprocket means in synchronism with the movement of film through said attachment as said film movement causes said sprocket to be rotated.

References Cited in the file of this patent
UNITED STATES PATENTS

| | | |
|---|---|---|
| 2,284,150 | Kemna | May 26, 1939 |
| 2,168,761 | Caldwell | Aug. 8, 1939 |
| 2,381,997 | Bolsey | Aug. 14, 1945 |
| 2,712,268 | Dietmann | July 5, 1955 |